United States Patent [19]

Holz

[11] Patent Number: 4,649,781

[45] Date of Patent: Mar. 17, 1987

[54] FOOD CUTTING APPARATUS

[76] Inventor: Ernst Holz, Wuerzburgerstrasse 74, D-7920 Heidenheim 5, Fed. Rep. of Germany

[21] Appl. No.: 834,749

[22] Filed: Feb. 28, 1986

[30] Foreign Application Priority Data

Apr. 29, 1985 [DE] Fed. Rep. of Germany ....... 3515415

[51] Int. Cl.[4] ................................................ B62D 7/26

[52] U.S. Cl. ..................................... 83/425.3; 83/168; 83/437; 83/446; 83/450; 198/721

[58] Field of Search ............................... 83/425–425.3, 83/431, 437, 444, 449, 450, 277, 168; 198/721

[56] References Cited

U.S. PATENT DOCUMENTS

| | | | |
|---|---|---|---|
| 13,367 | 7/1855 | Van Haagen | 83/425.1 |
| 2,849,102 | 8/1958 | Borrowdale | 198/605 |
| 3,511,122 | 5/1970 | Sherrill et al. | 83/422 X |
| 4,280,385 | 7/1981 | Kienzl | 83/444 X |

FOREIGN PATENT DOCUMENTS

| | | | |
|---|---|---|---|
| 1310212 | 3/1973 | United Kingdom | 83/425.2 |

*Primary Examiner*—James M. Meister

*Attorney, Agent, or Firm*—Welsh & Katz, Ltd.

[57] ABSTRACT

A food cutting apparatus with a feed chamber for feeding a food product, in which a longitudinally slidable pressure plate bias the food product against a cutting blade. Against each wall of the feed chamber is a conveyor belt movable at the same speed as the rate of feed of the food product by the pressure plate, thereby eliminating fouling of the wall surfaces and resulting in a more precise and repeatable cut.

13 Claims, 6 Drawing Figures

FOOD CUTTING APPARATUS

BACKGROUND OF THE INVENTION

This invention relates to an apparatus for cutting food products and more particularly, to a food cutting apparatus having a rectangular feed chamber for the material to be cut, in which a longitudinally slidable feed pressure plate biases the food product to be cut against a knife blade disposed on an open end of the feed chamber.

Cutting apparatus of the prior art are described in German patent application OS No. 29 23 003 and U.S. Pat. No. 4,498,387, and can slice or cut meat, as well as vegetables, in strips or cubes, as desired. In such apparatus such as these, the pressure plate pushes the food substance past a first knife blade, which cuts the food substance into parallel strips. A second circular cutting blade may be present which revolves in front of the first blade in a plane transverse to the direction of travel of the food product and cuts the food strips to result in a food product having the general shape of a cube.

For cutting food products with a high surface friction, such as cheese and other processed food products, this type of cutting apparatus, however, has rather limited applications. In particular, when cutting cheese, a steadily increasing adhesive friction is observed in the feed chamber during the advance of the pressure plate, with corresponding abrasion and deposit of food product on the walls of the feed chamber. With this type of cutting apparatus, it is difficult to generate strips or cubes of exact geometric dimensions. Furthermore, because of the abrasion and deposit of food on the feed chamber walls, the apparatus can become fouled or encrusted with the food product, requiring extensive down time for cleaning, which can become expensive.

An object of the present invention, therefore, is to create an apparatus for cutting strips or cubes of food products and which can efficiently and accurately cut processed food products having a highly abrasive and adhesive surface friction into a strip or cube form.

According to the present invention, the above problems can be solved by an apparatus having a plurality of endless conveyor belts, each located over at least a part of one of the walls of the magazine or feed chamber. Each belt is moved by the food product itself at the same speed as that of the food product which is pushed through the feed chamber by a magazine piston or pressure feed plate.

By the apparatus of the subject invention, most, if not all, of the abrasive action of the food product on the walls of the feed chamber and the consequent impedence to its movement can be eliminated. Further, the conveyor belts serve to facilitate and orient the feed of the food product to be cut in the proper direction in front of the pressure feed plate. Since the conveyor belts are moved generally at the same speed as the cutting matter, no abrasion with the feed chamber walls occurs, thereby avoiding the problems associated with the corresponding deposit of food product on the walls, and impedence of movement of the food product.

In general, each of the bottom and the two side walls of the feed chamber are spanned or covered with a conveyor belt. Each respective conveyor belt is deflected over idler rollers, and returned in a free space behind the food chamber wall.

If need be, however, only two conveyor belts arranged on opposite walls are required to facilitate the feed of the food product.

Abrasion and friction in the feeding of a food product can be virtually completely precluded if the cover of the feed chamber is spanned with a conveyor belt, while providing for the removal of the cover to allow the further introduction of food product to the apparatus. In the present invention, this is accomplished through a structure in which the cover is slidable in a longitudinal or transverse direction to the direction of feed of food product to an open position.

The cover serves in a known manner as a opening for supplying the food product to be cut, with a hopper or open receptacle located over the cover. If the cover is opened after completion of a cutting operation and after repositioning the pressure plate, more food product can fall into the feed chamber. This manner of batch feed can also be used according to the invention, providing the cover is slidable as a unit with the conveyor belt.

For easier cleaning and repair purposes, each conveyor belt should be detachably affixed to the housing and framework surrounding the feed chamber, which has a generally U-shaped profile. The two side walls of the feed chamber are supported by the two shank portions of the U-shaped profile and the bottom wall of the feed chamber lays on the inside on the middle portion of the U-shaped profile, thereby holding the feed chamber walls securely yet easily detachable from the housing. The walls which are spanned by the conveyor belts are spaced from the housing by shims, blocks or the like, thereby forming a free space behind the walls for the return of the conveyor belts. For a solid, but easily releasable and uniform connection, longitudinal grooves may be formed in the side walls for the support of the bottom wall and cover.

In front of the feed chamber on an open side, a gate flange is joined to the housing by screws or bolts to form a stop for the detachable walls of the feed chamber.

During the advance of the pressure feed plate a forward-directed force towards the knife blade can result in a diversion of some of that force onto the walls of the feed chamber. By the subject invention such diverted forces can be minimized or compensated for.

According to the present invention the walls in which the belt rollers are journaled and supported are maintained in place by added lateral extensions or stop means. The supports for the rollers form stops for the walls on their front ends to thereby maintain them in position about the feed chamber.

By drawing the gate flange inward of the area of the deflecting rollers stripping edges are thereby formed. At the end of the conveyor belts, i.e. in the area of the belt rollers where the conveyor belts are deflected downward and to the rear, there juts out a stationary part, which, when contact with the food product being fed occurs, presents the problem of abrasion and deposit of the food product thereon. To counteract this tendency, stripping edges are located therein, thereby providing a minimal gap between the roller and the stationary part, in this case the gate flange.

Further features and advantages accruing therefrom will be apparent from the following detailed description of one embodiment of the invention, when read in conjunction with the accompanying drawings.

DETAILED DESCRIPTION OF THE PREFERRED EMBODIMENT

Food cutting apparatus are generally known in the art, and accordingly only those parts essential to understand the present invention will be described in detail.

Figure 1:
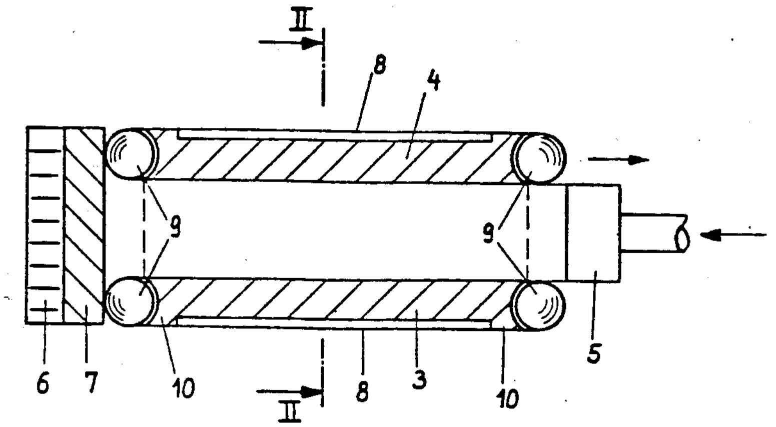
FIG. 1 is a theoretical representation of the strip and cube cutting apparatus of the present invention in longitudinal section.
Figure 2:
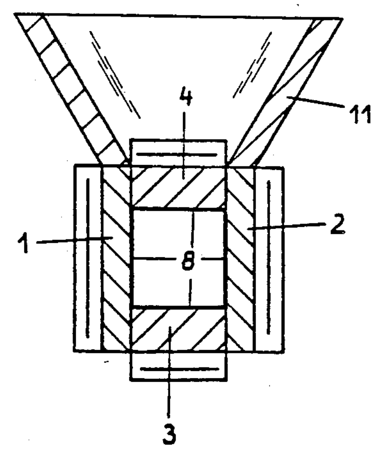
FIG. 2 is a section along the line II—II of the food cutting apparatus of FIG. 1.

Referring now to FIGS. 1 and 2, the magazine or feed chamber of the cutting apparatus of the subject invention comprises two side walls 1 and 2, a bottom wall 3 and an upper wall cover 4. Forming the rear wall of the feed chamber is a magazine piston or pressure plate 5, slidable within the feed chamber for the feed of the food product (not shown) in the direction of the arrow to thereby force the food product in the direction of a knife blade 6 located at the open front end of the feed chamber. Gate flange 7 is secured to the housing 12 outside the feed chamber at its forward edge, covering the forward edges of walls 1, 2, 3 and 4, thereby preventing forward movement of the walls toward the knife blade 6. The knife blade 6 is fastened over gate flange 7 to the walls of the feed chamber or to a housing part surrounding the feed chamber.

Each of the four walls 1, 2, 3, and 4 of the feed chamber are covered in the feed chamber with an endless conveyor belt 8, which is wrapped around rollers 9 located at both ends of the wall for free, continuous rotation. Spacers or blocks 10 create sufficient free spaces for the return of the conveyor belts 8. The rollers 9 are journaled in bearings in the walls of the feed chamber for the free rotation about their respective longitudinal axis to permit the movement of each of the conveyor belts 8 upon contact with food product which may be pushed through the feed chamber by the pressure plate. Thus, the movement of the food product through the feed chamber drives the conveyor belts which it comes in contact with, and the linear speed of the conveyor belt matches and is virtually identical to that of the food product and the pressure plate.

The cover 4 is slidable rearwardly in the longitudinal direction of the feed chamber, thereby opening an area 11 for accumulating food product prior to placement in the feed chamber and through which the food product above can be fed into the feed chamber.

In FIGS. 3 to 6 there is shown a structure which allows the walls to be removably secured in the housing 12 for purposes of cleaning and repair of the walls. As is evident, especially from FIG. 4, the housing 12 surrounds the feed chamber in a U-shaped profile form, having two upward-directed shanks in which are borne the two side walls 1 and 2 adjacent spacers 10.

As stated, the two side walls 1 and 2 are supported on the vertical shanks of the housing 12 and surround the feed chamber in a U-shaped profile over spacers 10, to form an open area 14 for the return travel of the conveyor belts 8 about rollers 9. The two side walls 1 and 2 each have horizontal longitudinal grooves or channels 13 in their upper area as well as in their lower area, which grooves serve for the reception and guidance of the bottom wall 3 and of the cover 4. To assemble the feed chamber of the subject invention, first the two side walls are slid in from in front. Thereupon the bottom is slid into the longitudinal grooves 13, and finally the cover 4 is slid in to complete the feed chamber. Screws 15 fasten the gate flange 7 to the housing 12. The screws 15 are provided in the region of their heads with vertical passage bores. After proper alignment so that their passage bores align with one another, a bolt 16 is inserted in each bore, and the knife blades 6 are fastened in front of the feed chamber.

The rollers 9 can be of any known type, such as a plastic roller shell 18 supported by bearing bolt 17. Each bearing bolt 17 is journaled in extension and stop 19. Because of space limitations, the extension 19 may be beveled at the front end. Extensions 19 also prevent lateral movement of the walls inward, to the feed chamber.

Figure 3:
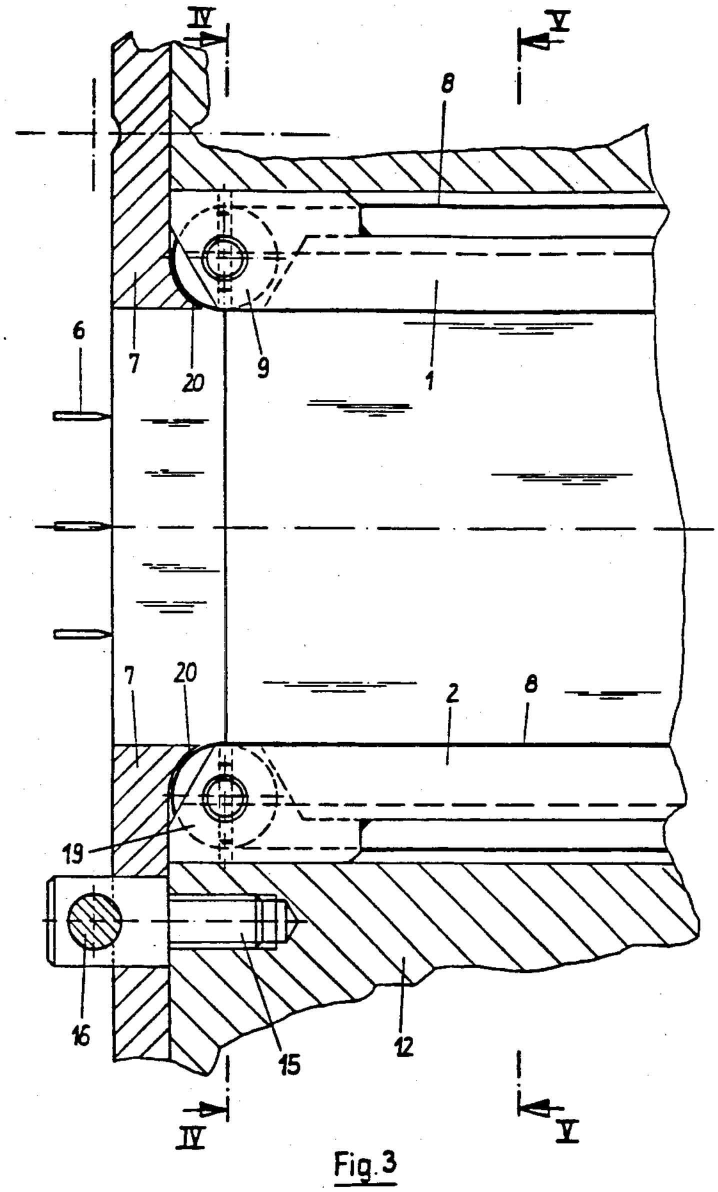
FIG. 3 is an embodiment of the front portion of the food cutting apparatus in horizontal longitudinal section.
Figure 4:
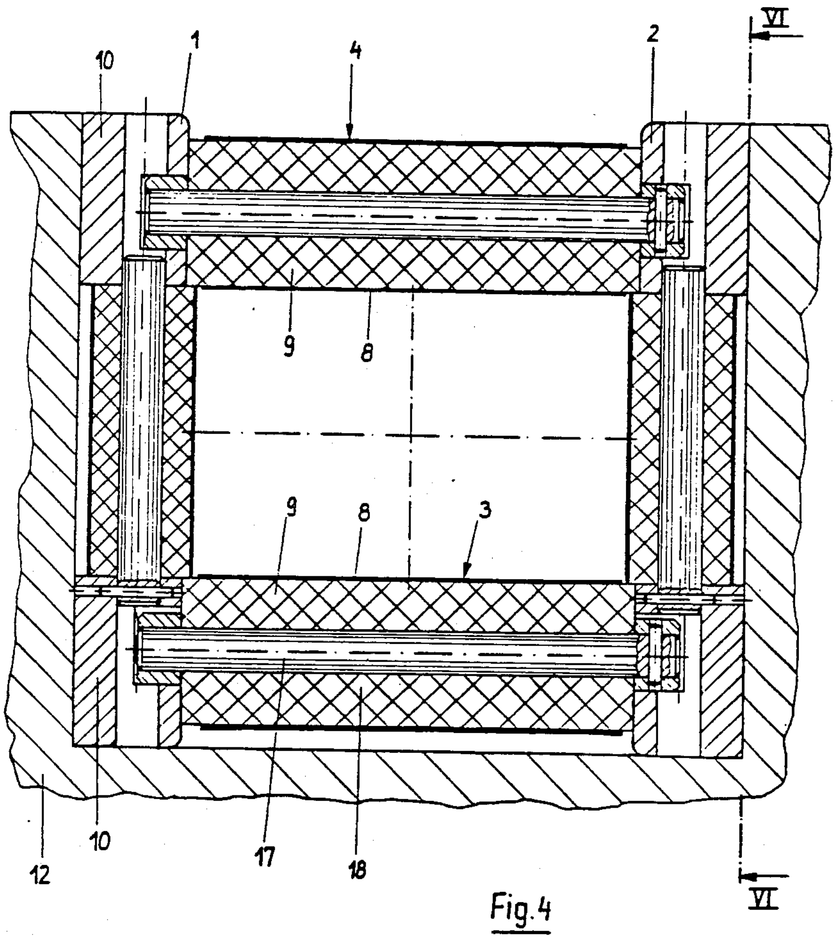
FIG. 4 is a cross-section taken along the line IV—IV of FIG. 3.
Figure 5:
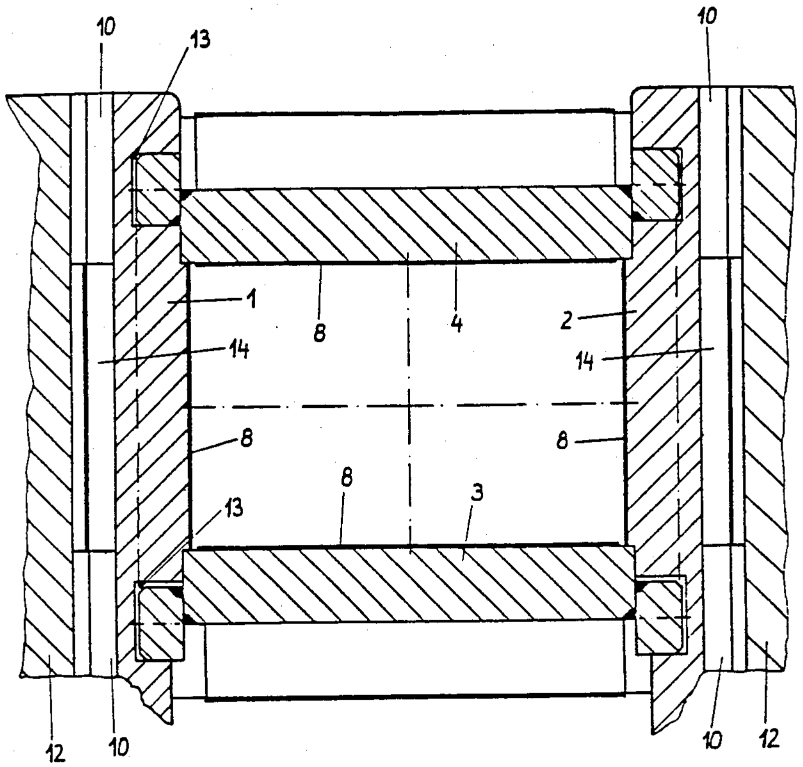
FIG. 5 is a cross-section taken along the line V—V of FIG. 3.
Figure 6:
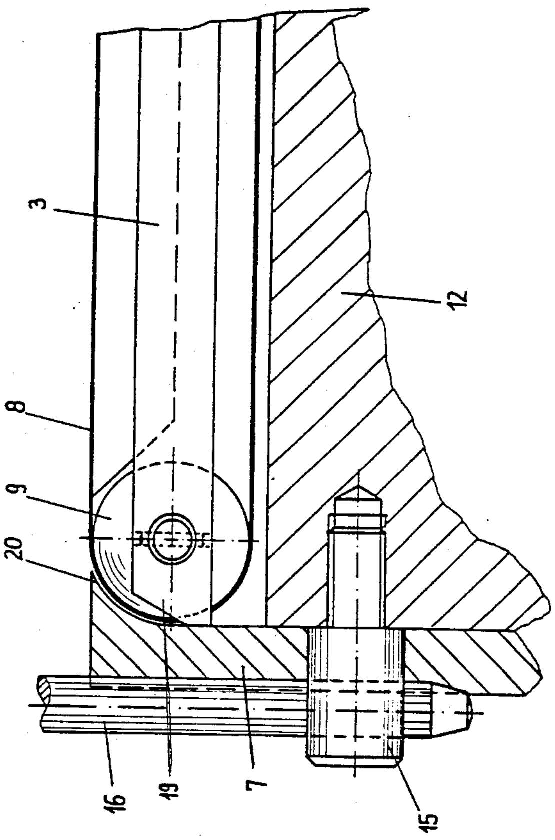
FIG. 6 is a cross-section taken along the line VI—VI of FIG. 4.

As is further evident from FIGS. 3 and 6, the gate flange 7 forms stripping edges 20, in the area of the rollers 9. These stripping edges are drawn inward and brought up as close as possible to the vertical plane of the axis of rotation of the roller, to preclude the passage and deposit of extraneous food product on the roller and prevent the obstruction and/or fouling of the feed chamber of the subject invention.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cutting apparatus for foods, comprising a feed chamber for processing food product, said feed chamber being enclosed by four walls, said walls comprising a bottom wall, two opposing side walls, and a cover; said feed chamber being open on at least one side, said feed chamber having a knife blade at said open side end and a pressure plate at an opposite second side, said pressure plate capable of moving said food product through said feed chamber for contact with and cutting by said cutting blade, characterized in that at least two of said walls are covered by an endless conveyor belt, said two walls being opposite one another; and each of said conveyor belts being movable at approximately the same speed and in the same direction as the advance of the food product by said pressure plate, thereby substantially eliminating friction and the deposit of the food product on said walls.

2. The cutting apparatus of claim 1 wherein said cover of the feed chamber is also covered by a conveyor belt.

3. The cutting apparatus of claim 1 wherein said cover is removable.

4. The cutting apparatus of claim 1 wherein each of said walls is secured to a support frame means in a removable manner.

5. The cutting apparatus of claim 4 wherein said support frame means has an approximately U-shaped profile, said side walls being supported on the two shanks of the U-shaped profile and said bottom wall resting on the inside of the middle portion of the U-shaped profile.

6. The cutting apparatus of claim 1 wherein said walls are secured to said housing with spacing means to form a space for the return of the conveyor belts about a roller means.

7. The cutting apparatus of claim 1 wherein said side walls have longitudinal grooves formed therein for the slidable placement of said bottom wall and said cover.

8. The cutting apparatus of claim 1 wherein a gate flange is secured by screw means to said cutting apparatus to form a stop preventing forward movement of said walls.

9. The cutting apparatus of claim 1 wherein rollers are journaled in extension means for the movement of said conveyor belt within said feed chamber, said extension means forming a stop to prevent lateral inward movement of said walls.

10. The cutting apparatus of claim 8 wherein said gate flange is drawn inward adjacent said rollers to form a stripping means for precluding the advance of the food product about said rollers.

11. The cutting apparatus of claim 1 wherein the advance of the food product with said feed chamber causes contact with said conveyor belt and drives said conveyor belt at substantially the same linear speed as said food product.

12. A cutting apparatus for foods, comprising a feed chamber for processing food product, said feed chamber being enclosed by four walls, said walls mounted in a U-shaped housing means, and open on at least one side, said feed chamber having a knife blade at said open side end and a pressure plate at an opposite second side, said pressure plate capable of moving said food product through said feed chamber for contact with and cutting by said cutting blade, each of said four walls being covered by an endless conveyor belt, each of said conveyor belts being movable at approximately the same speed as the movement of the food product by said pressure plate, thereby substantially eliminating friction and the deposit of the food product on said walls, said conveyor belts and said walls being removable from said housing means for cleaning.

13. The cutting apparatus of claim 12 wherein said cover of the feed chamber is also covered by a conveyor belt.

* * * * *